(12) United States Patent
Olgaard et al.

(10) Patent No.: US 9,319,298 B2
(45) Date of Patent: Apr. 19, 2016

(54) SYSTEM AND METHOD FOR DATA PACKET TRANSCEIVER TESTING AFTER SIGNAL CALIBRATION AND POWER SETTLING TO MINIMIZE TEST TIME

(71) Applicant: LITEPOINT CORPORATION, Sunnyvale, CA (US)

(72) Inventors: Christian Volf Olgaard, Saratoga, CA (US); Ruizu Wang, San Ramon, CA (US)

(73) Assignee: LITTLEPOINT CORPORATION, Sunnyvale, CA (US)

( * ) Notice: Subject to any disclaimer, the term of this patent is extended or adjusted under 35 U.S.C. 154(b) by 290 days.

(21) Appl. No.: 14/082,378

(22) Filed: Nov. 18, 2013

(65) Prior Publication Data

US 2015/0139023 A1      May 21, 2015

(51) Int. Cl.
*H04L 12/26* (2006.01)
*H04W 24/06* (2009.01)

(52) U.S. Cl.
CPC .............. *H04L 43/50* (2013.01); *H04W 24/06* (2013.01)

(58) Field of Classification Search
CPC ....... H04L 43/50; H04W 24/00; H04W 24/06
See application file for complete search history.

(56) References Cited

U.S. PATENT DOCUMENTS

| | | | |
|---|---|---|---|
| 2008/0191712 A1 | 8/2008 | Eisenstadt et al. | |
| 2008/0285467 A1* | 11/2008 | Olgaard | H04B 17/0085 370/242 |
| 2010/0008237 A1 | 1/2010 | Olgaard et al. | |
| 2010/0123471 A1 | 5/2010 | Olgaard et al. | |
| 2011/0069624 A1 | 3/2011 | Olgaard | |
| 2015/0058691 A1* | 2/2015 | Olgaard | G01R 31/31871 714/734 |
| 2015/0063133 A1* | 3/2015 | Olgaard | H04W 24/08 370/252 |
| 2015/0304864 A1* | 10/2015 | Olgaard | H04W 24/06 370/251 |

FOREIGN PATENT DOCUMENTS

WO       2011127973 A1     10/2011

OTHER PUBLICATIONS

International Search Report and Written Opinion for PCT/US2014/064938, mailed Feb. 5, 2015, 10 pages.

* cited by examiner

*Primary Examiner* — Melvin Marcelo
(74) *Attorney, Agent, or Firm* — Vedder Price, P.C.

(57) ABSTRACT

A system and method for testing one or more wireless data packet signal transceiver devices under test (DUTs). Incoming data packets from a DUT are monitored to discern between data packets transmitted as part of a DUT calibration cycle or initial data packets being transmitted as the DUT transmitter circuitry settles at its new settings (e.g., transmit signal frequency or power), and later data packets transmitted following completion of the DUT calibration cycle or settling of the DUT transmitter circuitry. Following identification of these later data packets, the tester is so notified and begins the test procedure, e.g., capturing the data packets for analysis. Meanwhile, the tester has been allowed to remain in active use for other test purposes during DUT calibration cycles and settling intervals, thereby increasing testing efficiency and reducing overall test time.

14 Claims, 6 Drawing Sheets

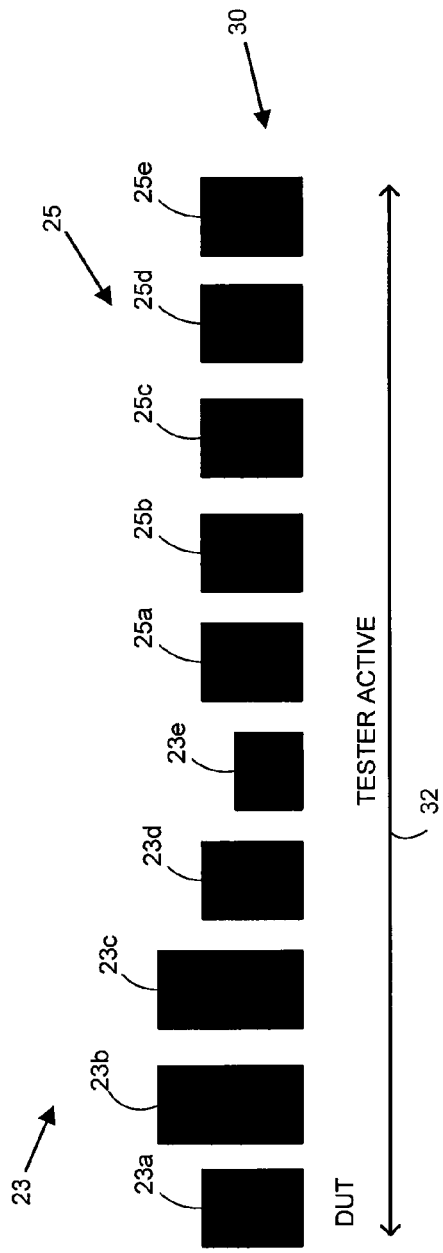
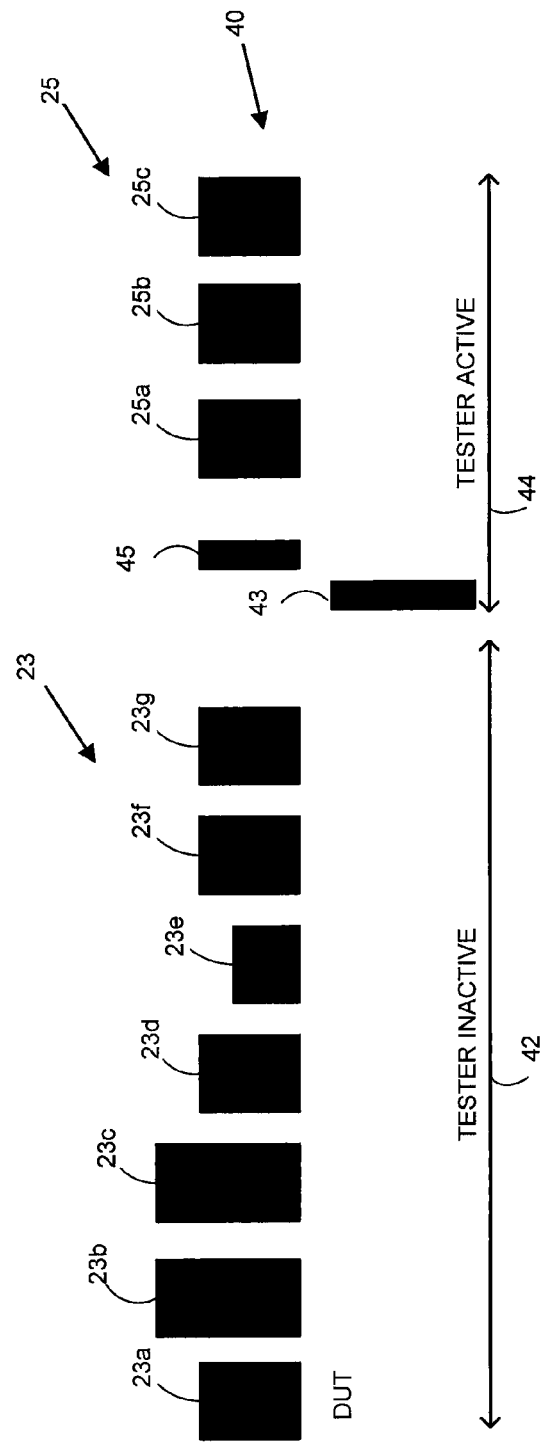

SYSTEM AND METHOD FOR DATA PACKET TRANSCEIVER TESTING AFTER SIGNAL CALIBRATION AND POWER SETTLING TO MINIMIZE TEST TIME

BACKGROUND

The present invention relates to testing data packet transceivers, and in particular, to minimizing test time by distinguishing between calibration and power settling signal intervals and normal data packet signal transmission intervals so as to perform testing tasks only after the device under test (DUT) has completed calibration and/or power settling.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal generator (VSG) for providing the source signals to be transmitted to the device under test, and a vector signal analyzer (VSA) for analyzing signals produced by the device under test. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

As part of the manufacturing of wireless communication devices, one significant component of production cost is costs associated with manufacturing tests. Typically, there is a direct correlation between the cost of test and the sophistication of the test equipment required to perform the test. Thus, innovations that can preserve test accuracy while minimizing equipment costs (e.g., increasing costs due to increasing sophistication of necessary test equipment, or testers) are important and can provide significant costs savings, particularly in view of the large numbers of such devices being manufactured and tested.

Accordingly, it would be desirable to have techniques for testing increasingly sophisticated DUTs with increasingly varied performance characteristics and requirements without also requiring increasingly sophisticated testers with similarly increasingly varied testing characteristics and requirements.

SUMMARY

In accordance with the presently claimed invention, a system and method are provided for testing one or more wireless data packet signal transceiver devices under test (DUTs). Incoming data packets from a DUT are monitored to discern between data packets transmitted as part of a DUT calibration cycle or initial data packets being transmitted as the DUT transmitter circuitry settles at its new settings (e.g., transmit signal frequency or power), and later data packets transmitted following completion of the DUT calibration cycle or settling of the DUT transmitter circuitry. Following identification of these later data packets, the tester is so notified and begins the test procedure, e.g., capturing the data packets for analysis. Meanwhile, the tester has been allowed to remain in active use for other test purposes during DUT calibration cycles and settling intervals, thereby increasing testing efficiency and reducing overall test time.

In accordance with one embodiment of the presently claimed invention, a system for testing one or more wireless data packet signal transceiver devices under test (DUTs) includes: signal routing circuitry to convey one or more data packet signals from a corresponding one or more DUTs; measurement circuitry coupled to the signal routing circuitry to measure the one or more data packet signals and in response thereto provide one or more measurement signals related to at least one of a duration and power level of each of the one or more data packet signals; control circuitry coupled to the measurement circuitry and responsive to the one or more measurement signals by providing one or more control signals indicative of when each of the at least one of a duration and power level of each of the one or more data packet signals has a value within a respective predetermined range; and test circuitry coupled to the signal routing circuitry and the control circuitry, and responsive to the one or more control signals by capturing at least a respective portion of each of the one or more data packet signals for which the one or more control signals is indicative of each of the at least one of a duration and power level of a corresponding one of the one or more data packet signals having a value within the respective predetermined range.

In accordance with another embodiment of the presently claimed invention, a method of testing one or more wireless data packet signal transceiver devices under test (DUTs) includes: conveying one or more data packet signals from a corresponding one or more DUTs; measuring the one or more data packet signals to provide one or more measurement signals related to at least one of a duration and power level of each of the one or more data packet signals; responding to the one or more measurement signals by providing one or more control signals indicative of when each of the at least one of a duration and power level of each of the one or more data packet signals has a value within a respective predetermined range; and responding to the one or more control signals by capturing at least a respective portion of each of the one or more data packet signals for which the one or more control signals is indicative of each of the at least one of a duration and power level of a corresponding one of the one or more data packet signals having a value within the respective predetermined range.

BRIEF DESCRIPTION OF THE DRAWINGS

FIG. 3 depicts exemplary data packet characteristics of a signal transmission sequence including a transmitter signal power settling interval and valid data packet interval, during all of which the tester is active.

FIG. 4 depicts the signal sequence of FIG. 3 with the addition of a synchronization signal exchange between the tester and DUT preceded by an inactive tester interval and followed by an active tester interval.

DETAILED DESCRIPTION

Figure 1:
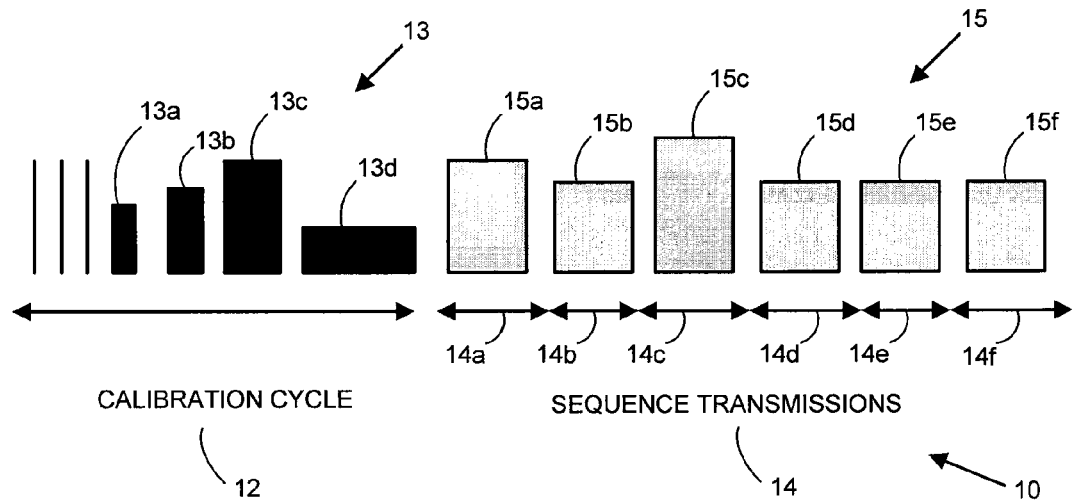
FIG. 1 depicts exemplary data packet characteristics of a signal transmission sequence including a preceding calibration cycle.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Due to the nature of their signals, many wireless data packet signal transmitters transmit special calibration data packets during transmission startup or when changing the frequency or frequency band of transmission. This is done to ensure that the DUT is operating correctly before beginning normal transmission of the data packets of interest. Accordingly, suppressing such pre-transmission data packets during testing would alter the true operational behavior of the DUT. However, a trigger mechanism on a tester that does not sufficiently discriminate between pre-transmission and normal data packets can cause testing to begin on such pre-transmission data packets and, thereby, detect what it identifies as signal errors when, in fact, no such errors exist (i.e., false negatives), e.g., due to the non-deterministic nature of the pre-transmission signal patterns.

One technique to avoid triggering on pre-transmission data packets would be to allow a predetermined time interval to pass before enabling the tester to begin measuring received data packets. Alternatively, another technique would be to have the DUT initially transmit a series of dummy data packets before commencing testing on the real test data packets that follow. In either case, however, the allocated test time becomes extended, thereby increasing the overall cost of test.

As discussed in more detail below, in accordance with exemplary embodiments of the presently claimed invention, a system and method are provided for dynamically distinguishing between pre-transmission and normal, or desired, transmission data packets as part of the overall test procedure so as to accurately capture and test the desired portion of the signal when it has settled to its steady state. Power meter subsystems (typically low in cost) can be connected between each DUT and its tester, and programmed to detect and measure one or more characteristics of the pre-transmission data packets and initial normal transmission data packets for purposes of alerting the tester when and which data packets are ready (e.g., normal data packets for which the transmitter signal power has settled) for testing (e.g., capture and analysis). Support for multiple DUTs and multiple power meters can also be provided to enable this process to be done in parallel, e.g., concurrently, for each of the multiple DUTs. Further, because a shared VSA within the tester can change its reception frequency very quickly, the DUTs need not be transmitting at the same signal frequency during such parallel testing. Further, in addition to distinguishing between pre-transmission data packets (e.g., for calibration or power settling) and transmission data packets, such system and method can be used to determine when the transmitted DUT data packets have settled in power and duration, thereby avoiding testing during unstable transmitter output signal power or varying packet duration.

As also discussed in more detail below, in accordance with further exemplary embodiments of the presently claimed invention, a system and method are provided for allowing the DUT(s) to continue transmitting as it reaches its steady, or settled, transmit power, following which the DUT(s) wait for a command from the tester to continue with its transmission of data packets. This can be done with multiple DUTs transmitting in parallel, thereby allowing the tester to initiate testing of the DUTs by sending test initiation commands and scheduling testing of the respective DUTs based on which and when respective DUTs reply in response.

Referring to FIG. 1, it is common for a DUT to begin its signal transmission with a calibration cycle 12 during which multiple data packets 13 are transmitted with different data packet power levels and durations 13a, 13b, 13c, 13d. This is followed by a sequence 14 of normal data packets 15, of which the initial data packets 15a, 15b, 15c will typically exhibit different power levels due to the settling of the transmitter circuitry within the DUT. These are followed further by data packets 15d, 15e, 15f which will exhibit consistent data packet power levels consistent with the transmitter circuitry having settled to its steady state operation.

Figure 2:
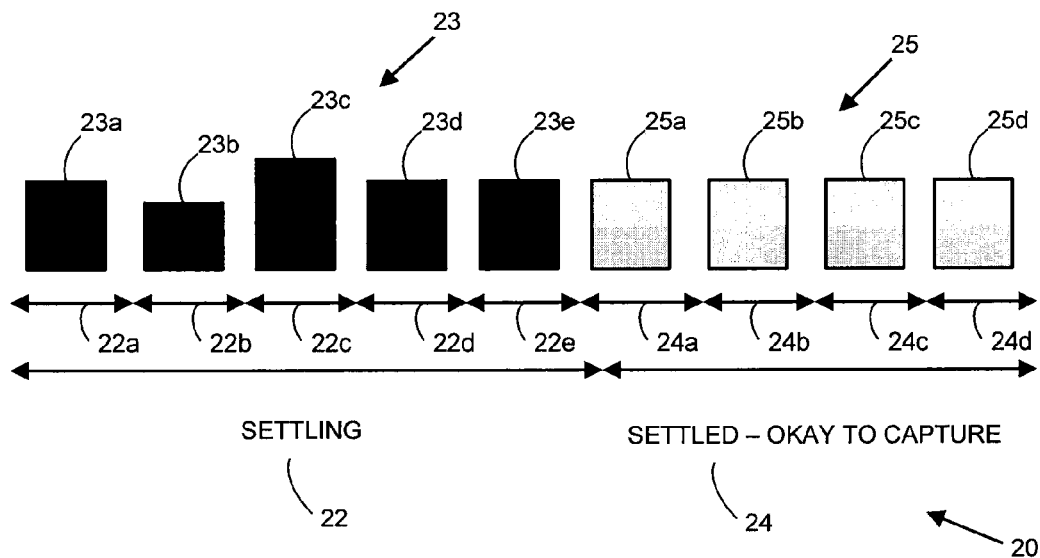
FIG. 2 depicts exemplary data packet characteristics of a signal transmission sequence including a preceding transmitter signal power settling interval.

Referring to FIG. 2, in the event that a calibration cycle 12 (FIG. 1) is not required, the sequence 20 of data packets transmitted by the DUT will initially include data packets 23 transmitted during a settling interval, i.e., during which, as discussed above, the transmitter circuitry of the DUT is settling to its steady state operation following a change in transmitted signal power or frequency (or a change in modulation type or bit rate affecting transmitted signal power indirectly). During this settling interval 22, the data packets 23 will exhibit varying power levels. Once the DUT transmitter circuitry has settled, transmission of the sequence 24 of normal data packets beings, during which the data packets 25 exhibit consistent signal power levels (e.g., in accordance with the signal standard being tested).

Referring to FIG. 3, as discussed above, conventional testing technics have had the tester become and remain active 32 at least from the time that the DUT begins transmitting its data packets 23, 25. Hence, the tester is receiving the initial data packets 23 even as the transmitter circuitry is still settling to its steady state operation. As a result, at best, use of the tester is wasted during the time in which the data packets 23 having varying power levels are received, since no reliable test data can be produced, and, at worst, false negatives will be produced as a result of the tester identifying errors due to inconsistent data packets power levels.

Referring to FIG. 4, in accordance with exemplary embodiments of the presently claimed invention, during the initial sequence 23 of data packets when the transmitter circuitry is still settling to its steady state operation, the tester is inactive 42. In other words, the tester is inactive in terms of its performing testing tasks such as capturing and analyzing data packets from the DUT as its transmitter circuitry is settling, though the tester may perform other types of tasks. For example, the tester will transmit a synchronization (sync) signal 43 to the DUT to determine whether and when the DUT transmitter circuitry has settled thereby making the DUT ready for testing. If the DUT is not ready, no response will be forthcoming and the tester will continue with or move on to other tasks, such as transmitting a sync signal to another DUT to initiate synchronization and testing with such other DUT while the first DUT completes its settling. Then, later when settling by the first DUT has been achieved, the tester returns its attention and transmits a sync signal 43 again to the first DUT, to which the DUT now responds with an acknowledgement (ACK) or other synchronization response signal 45 and begins transmitting its sequence 25 of data packets for reception and analysis by the tester.

Figure 5:
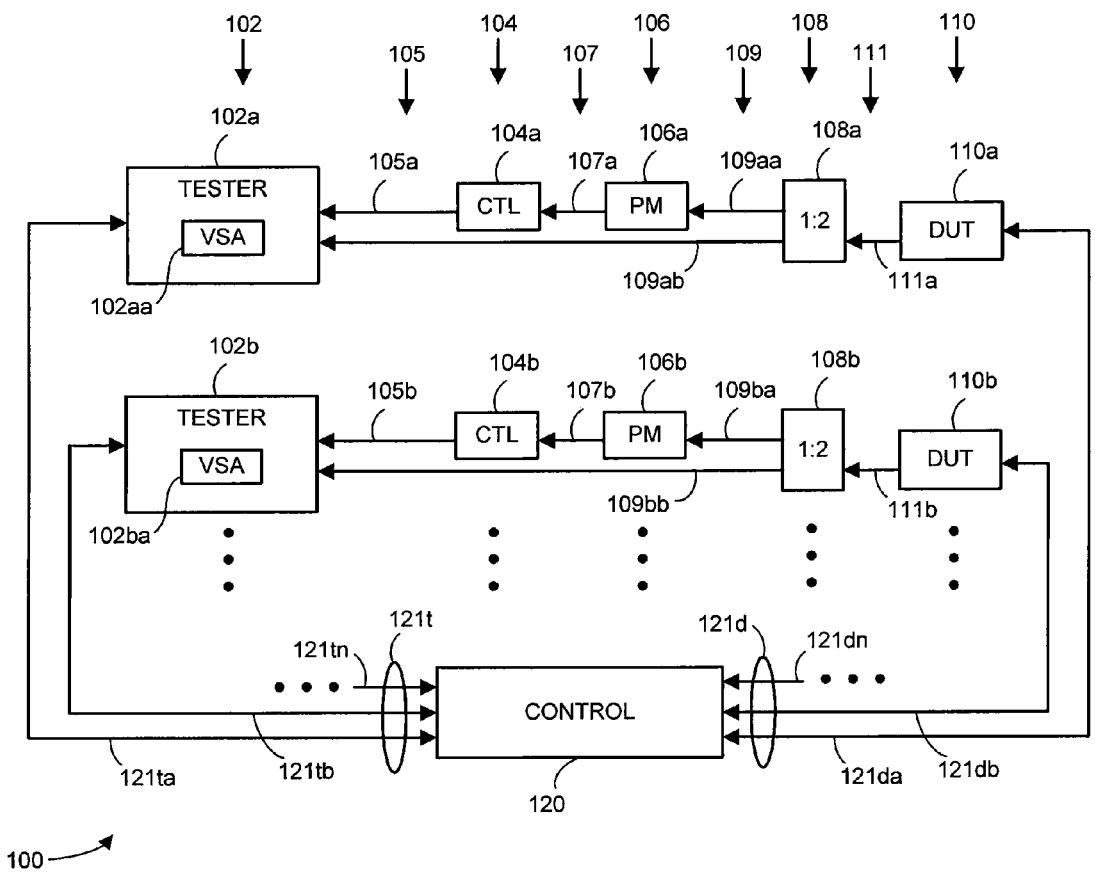
FIG. 5 depicts an exemplary embodiment of a testing environment for testing in accordance with the presently claimed invention.

Referring to FIG. 5, in accordance with exemplary embodiments of the presently claimed invention, a testing environment 100 for testing one or more DUTs includes one or more testers 102, control circuitry 104, power measurement circuitry 106 and signal replicators 108 (e.g., signal power dividers, couplers or splitters), all interconnected substantially as shown, for testing one or more DUTs 110 in accordance with instructions from a controller 120 (e.g., a personal computer connected directly via control signal interfaces 121t, 121d or via a network by which such control signal interfaces 121t, 121d are provided virtually). These elements 102, 104, 106, 108, 110 communicate by conveying signals via the signal paths 105, 107, 109, 111, which are typically in the form of conductive signal paths (e.g., radio frequency (RF) coaxial cables and connections). For example, the transmit signal from the first (or only) DUT 110a is conveyed to its associated signal replicator 108a by a signal path 111a. One of the replicated signals from the signal replicator 108a is conveyed via a signal path 109ab to the tester 102a for reception and analysis by its receiver (e.g., a VSA) 102aa. The other replicated signal is conveyed via another signal path 109aa to the power measurement circuitry 106a (e.g., a power sensor or power meter).

The resulting one or more power measurement signals are conveyed via a signal path 107a to the associated control circuitry 104a which provides a control signal via another signal path 105a to the tester 102a. This control signal is indicative of when the transmit signal from the DUT has a data packet signal duration or power level within a predetermined range (e.g., in accordance with the signal standard being tested). The control circuitry 104a can be separate and external from the power measurement circuitry 106a and tester 102a, or, alternatively, can be included (in whole or in part) as part of the power measurement circuitry 106a or tester 102a.

Hence, the power measurement circuitry 106a, by measuring the power envelope or power level (or both) of the DUT transmit signal, provides one or more power measurement signals to the control circuitry 104a, which, in turn, provides a control signal to the tester 102a informing the tester 102a when the duration of the DUT transmit signal has achieved or settled within a predetermine range of signal durations or the power level of the DUT transmit signal has achieved and maintained a power level within a predetermined range of power levels (e.g., in accordance with the signal standard being tested).

When determining whether or when a data packet signal duration or power level is within a predetermined range (e.g., in accordance with the signal standard being tested) as discussed herein, it is not always possible to determine based on an absolute range (of signal durations or power levels). Accordingly, it can also be a relative range. For example, in accordance with the signal standard for which the DUT is being tested, this determination can be made in terms of the signal duration or power level settling to within a required relative range, such as a predetermined time or power window defining a nominal average signal duration or power level.

Figure 6:
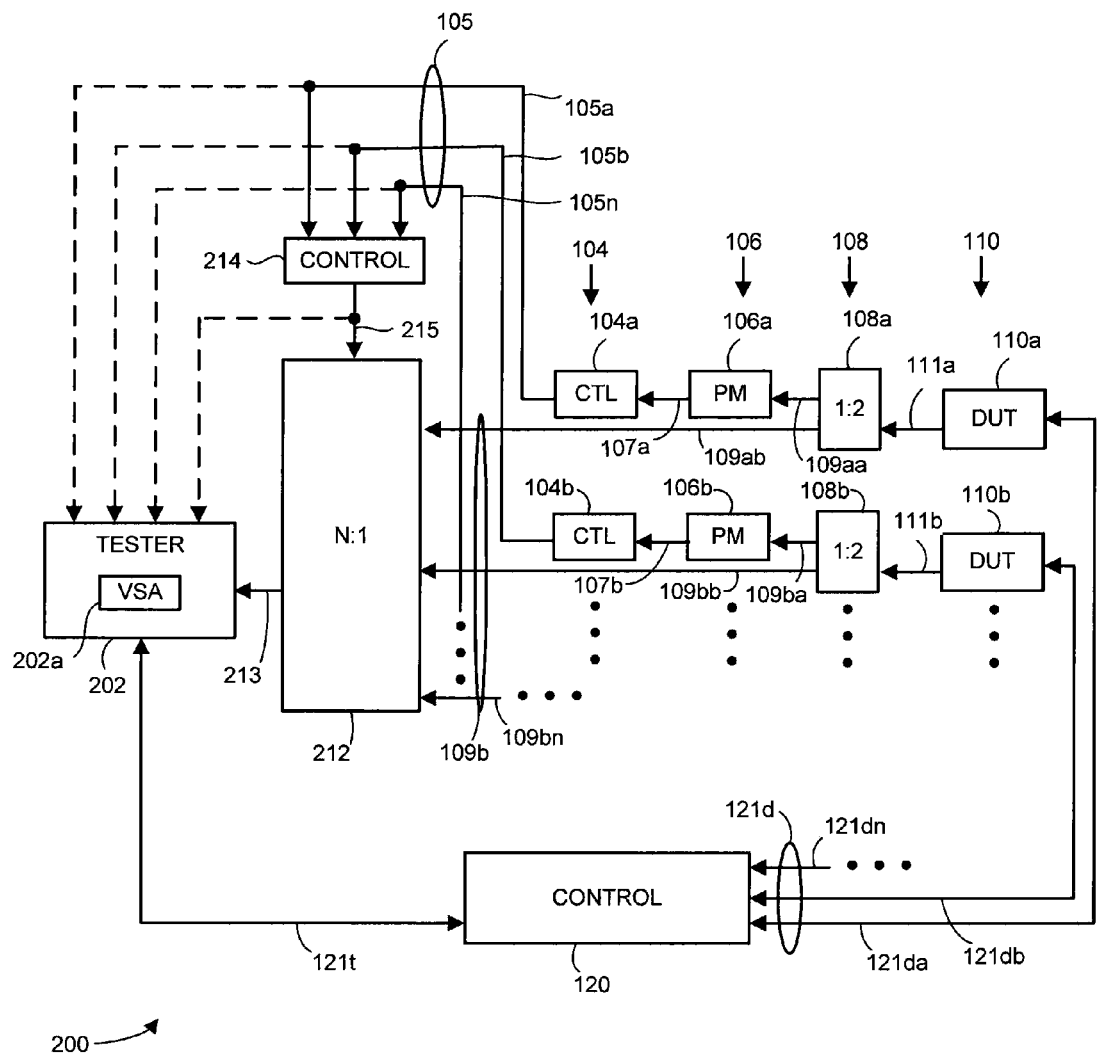
FIG. 6 depicts an another exemplary embodiment of a testing environment for testing in accordance with the presently claimed invention.

Referring to FIG. 6, in accordance with further exemplary embodiments, another testing environment 200 can be implemented using a single tester 202 and signal routing circuitry 212 (e.g., switching or multiplexor circuitry). Additional control circuitry 214 can be used to receive (e.g., decode) control signals 105 from the other controllers 104 to route the DUT transmit signal received via the signal paths 109b from the signal replicators 108 that has been identified by the control signals 105 from the controllers 104 as ready for testing (e.g., indicative of the DUT transmit signal having one or both of a data packet duration and power level within the respective prescribed range). The routed signal 213 is received by the tester 202 for capturing and analysis by its receiver 202a.

Hence, as can be seen by these alternative testing environments 100, 200, multiple DUTs 110 can be tested concurrently using multiple testers 102 (FIG. 5), or multiple DUTs 110 can be tested using a single tester 202 (FIG. 6).

Figure 7:
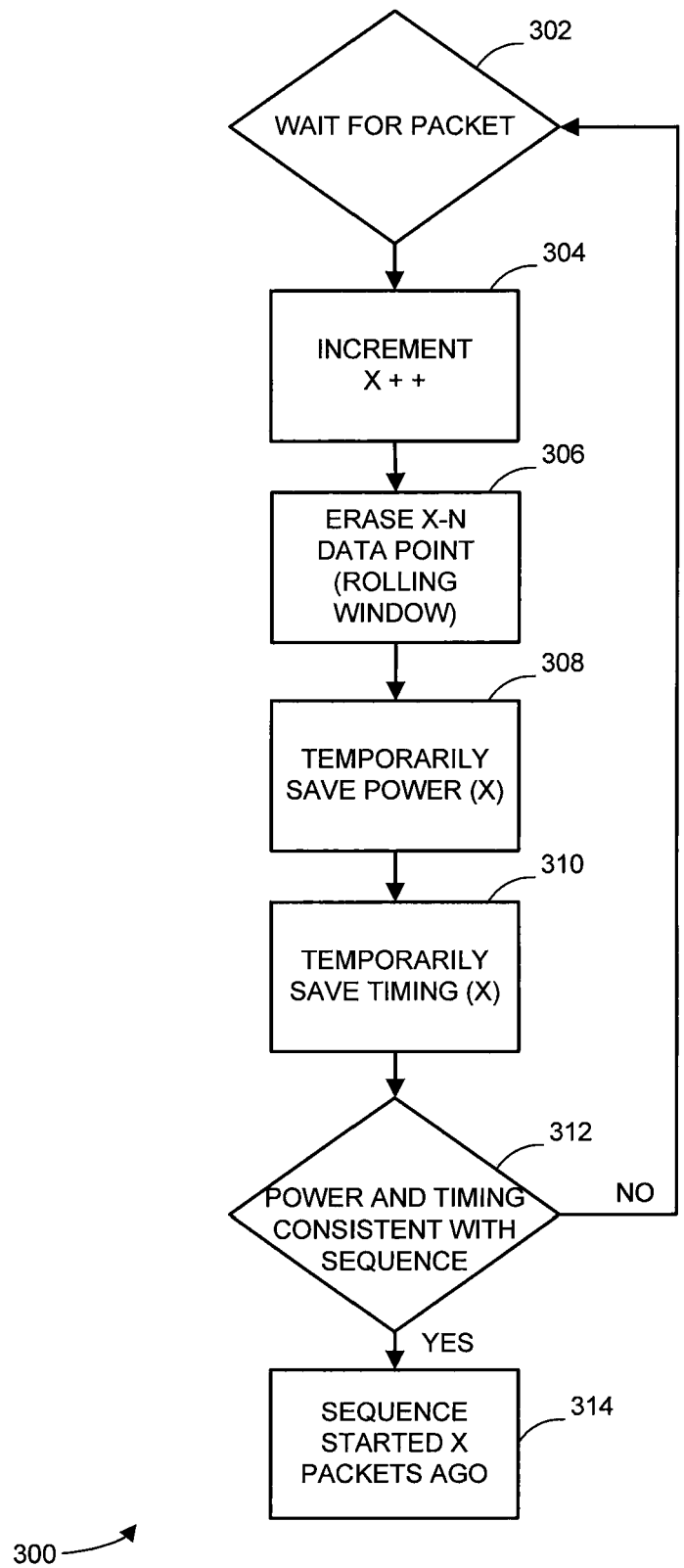
FIG. 7 depicts a flowchart for an exemplary method of determining conclusion of a pre-transmission sequence following which testing can begin in accordance with the presently claimed invention.

Referring to FIG. 7, in accordance with exemplary embodiments, the power meters circuits 106 and associated controllers 104 can measure and store the power levels and durations of the incoming data packets from the DUTs for comparison to power level and duration values consistent with a regular data packet signal sequence, e.g., a signal sequence consistent with the transmitter circuitry having settled to its steady state operation. Where the results are inconsistent with such a sequence, such measurements and storage are repeated. Once the results are consistent with such a sequence, the power meter subsystem (e.g., the power measurements circuitry 106 and associated controller 104) signals to the tester that testing (e.g., data packet capture and analysis) can begin.

For example, in accordance with an exemplary embodiment, this process begins by waiting for the packet 302, followed by incrementing a sequence counter 304 and erasing the previously stored value (e.g., in a first-in, first-out (FIFO) operation) 306. The newly measured power 308 and duration 310 values are saved and compared 312 with prescribed or otherwise predetermined values. If these measured values are not consistent with a settled data packet signal sequence, these steps 302, 304, 306, 308, 310, 312 are repeated. If they are consistent, the tester is informed 314 that the sequence has started.

Figure 8:
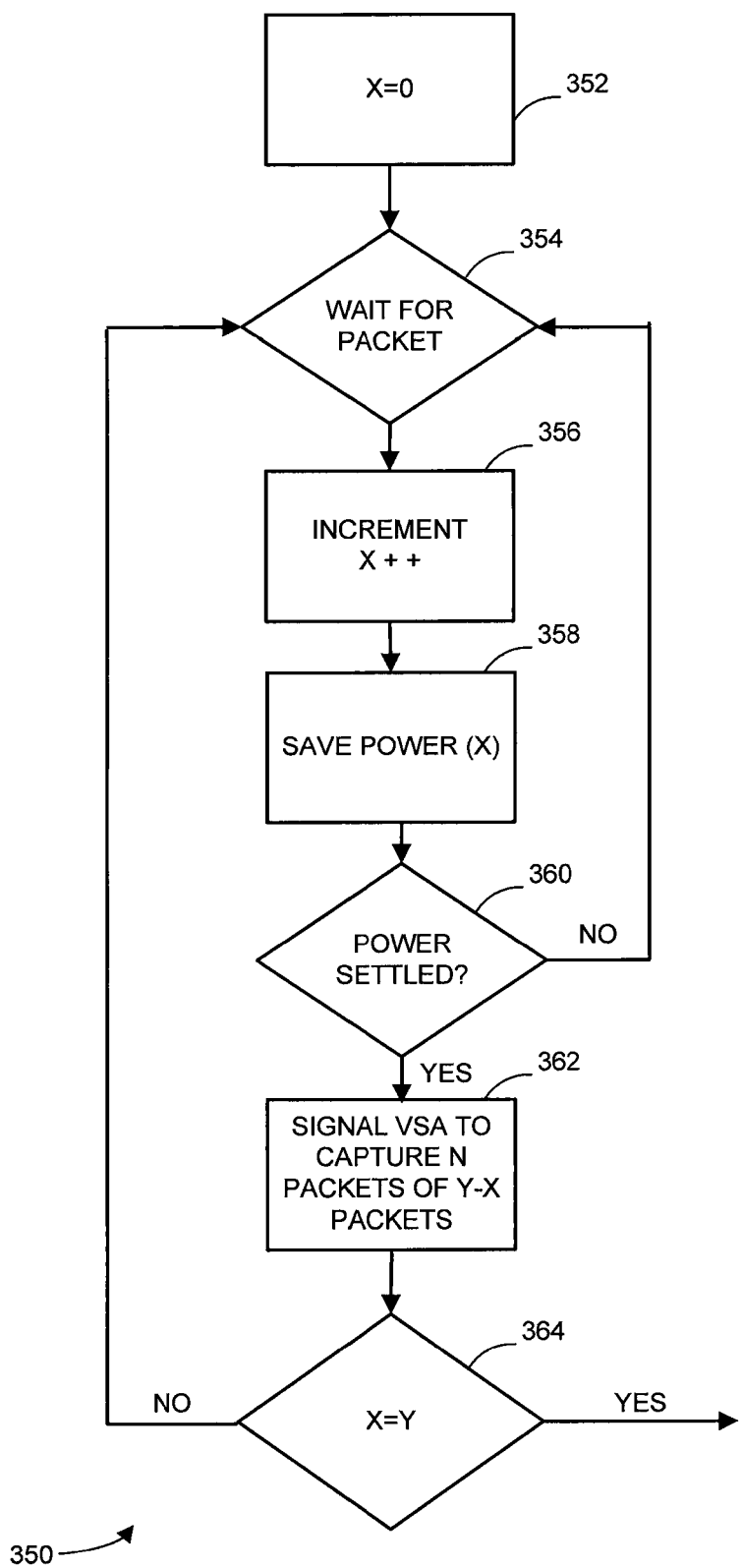
FIG. 8 depicts a flowchart for an exemplary method of determining conclusion of a transmitter signal power settling sequence following which testing can begin in accordance with the presently claimed invention.

Referring to FIG. 8, a test sequence 350 in accordance with further exemplary embodiments includes measuring and tracking of power levels of incoming data packets for comparison to substantially consistent values that are characteristic of a settled DUT transmitter circuit. If the measured results are not consistent with a settled transmitter condition, power levels continue to be detected and measured. If the results are consistent with a settled transmitter condition, the power meter subsystem signals the tester that testing can begin.

For example, in accordance with an exemplary embodiment, at a count of zero 352, testing is initiated by waiting for a data packet 354. Following reception of a data packet, the counter is incremented 356 and the measured power is saved 358 and compared 360 to a power level or range of power levels consistent with a settled DUT transmitter condition. If the measured valued is inconsistent with such condition, these steps 354, 356, 358, 360 are repeated. If the value is consistent with a settled condition, the power meter subsystem signals the tester to initiate capturing the desired number N of data packets 362. If the number of captured data packets are not equal to a predetermined number 364, the process is restarted by waiting for another data packet 354. When the predetermined number of data packets have been captured, testing is complete.

Accordingly, by monitoring the DUT transmit signals with the power meter subsystems, connections of the respective DUTs 110 (FIG. 6) to the tester 202 (via the routing circuitry 212) can be scheduled. By monitoring the settling of the DUT transmitter outputs in parallel, more optimal use of the shared VSA 202a can be achieved. For example, dynamic scheduling of capturing of data packets from a particular DUT 110a, 110b, . . . can be achieved in something other than a predeterministic manner. In other words, if a second DUT 110b is ready before a first DUT 110a, the testing environment 200 can schedule the VSA 202a to capture the transmit signal from the second DUT 110b (via the associated signal replicator 108b and signal router 212) prior to capturing the transmit signal from the first DUT 110a. On the other hand, if, prior to the next test, it is the first DUT 110a that has settled first, that DUT 110a would be scheduled for data packet signal capturing before the second DUT 110b. Hence, this allows for a more optimal scheduling of use of the hardware, particularly the tester 202, resulting in completion of a defined set of data packet captures more quickly. When using data packet sequences, this will allow for testing without need for use of a data packet sequence designed for a worst-case performance scenario (e.g., as compared to a predetermined sequence) where such a worst case design would accommodate the first scheduled DUT taking the longest to settle.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for testing one or more wireless data packet signal transceiver devices under test (DUTs), comprising:
signal routing circuitry to convey one or more data packet signals from a corresponding one or more DUTs;
measurement circuitry coupled to said signal routing circuitry to measure said one or more data packet signals and in response thereto provide one or more measurement signals related to at least one of a duration and power level of each of said one or more data packet signals;
control circuitry coupled to said measurement circuitry and responsive to said one or more measurement signals by providing one or more control signals indicative of when each of said at least one of a duration and power level of each of said one or more data packet signals has a value within a respective predetermined range; and
test circuitry coupled to said signal routing circuitry and said control circuitry, and responsive to said one or more control signals by capturing at least a respective portion of each of said one or more data packet signals for which said one or more control signals is indicative of each of said at least one of a duration and power level of a corresponding one of said one or more data packet signals having a value within said respective predetermined range.

2. The apparatus of claim 1, wherein said signal routing circuitry comprises one or more signal dividers.

3. The apparatus of claim 1, wherein said signal routing circuitry comprises one or more signal couplers.

4. The apparatus of claim 1, wherein said measurement circuitry comprises one or more signal power sensors.

5. The apparatus of claim 1, wherein said measurement circuitry comprises one or more signal power meters.

6. The apparatus of claim 1, wherein:
said one or more measurement signals include a plurality of signal data representing said each of said at least one of a duration and power level of each of said one or more data packet signals; and
said control circuitry comprises processing circuitry to compare said plurality of signal data with a plurality of range data representing said respective predetermined range for each of said at least one of a duration and power level of each of said one or more data packet signals.

7. The apparatus of claim 1, wherein said test circuitry comprises a vector signal analyzer.

8. A method of testing one or more wireless data packet signal transceiver devices under test (DUTs), comprising:
conveying one or more data packet signals from a corresponding one or more DUTs;
measuring said one or more data packet signals to provide one or more measurement signals related to at least one of a duration and power level of each of said one or more data packet signals;
responding to said one or more measurement signals by providing one or more control signals indicative of when each of said at least one of a duration and power level of each of said one or more data packet signals has a value within a respective predetermined range; and
responding to said one or more control signals by capturing at least a respective portion of each of said one or more data packet signals for which said one or more control signals is indicative of each of said at least one of a duration and power level of a corresponding one of said one or more data packet signals having a value within said respective predetermined range.

9. The method of claim 8, wherein said conveying one or more data packet signals comprises power-dividing each of said one or more data packet signals.

10. The method of claim 8, wherein said conveying one or more data packet signals comprises power-coupling each of said one or more data packet signals.

11. The method of claim 8, wherein said measuring said one or more data packet signals comprises sensing a power of each of said one or more data packet signals with a respective signal power sensor.

12. The method of claim 8, wherein said measuring said one or more data packet signals comprises measuring a power of each of said one or more data packet signals with a respective signal power meter.

13. The method of claim 8, wherein:

said one or more measurement signals include a plurality of signal data representing said each of said at least one of a duration and power level of each of said one or more data packet signals; and said responding to said one or more measurement signals comprises comparing said plurality of signal data with a plurality of range data representing said respective predetermined range for each of said at least one of a duration and power level of each of said one or more data packet signals.

14. The method of claim 8, wherein said responding to said one or more control signals comprises capturing said at least a respective portion of each of said one or more data packet signals with a vector signal analyzer.

\* \* \* \* \*